United States Patent [19]

Bosch et al.

[11] 3,955,988

[45] May 11, 1976

[54] BINDER COMPOSITION FOR INORGANIC COMPOUNDS

[75] Inventors: Erhard Bosch; Michael Roth; Konrad Gogolok, all of Burghausen, Germany

[73] Assignee: Wacker-Chemie GmbH, Munich, Germany

[22] Filed: Apr. 12, 1974

[21] Appl. No.: 460,635

[30] Foreign Application Priority Data

Apr. 12, 1973  Germany............................ 2318494

[52] U.S. Cl.................... 106/38.35; 106/287 SB; 106/287 SE; 260/448.8 A
[51] Int. Cl.²........................................... B28B 7/34

[58] Field of Search..... 106/287 R, 287 SB, 287 SE, 106/38.2, 38.3, 38.35; 260/825, 25, 448.8 A

[56] References Cited

UNITED STATES PATENTS

| | | | |
|---|---|---|---|
| 1,809,755 | 6/1931 | King et al. | 260/448.8 A |
| 2,799,693 | 7/1957 | Dodgson | 260/448.8 A |
| 3,392,036 | 7/1968 | McLead | 106/287 SB |
| 3,786,015 | 1/1974 | Merrill et al. | 260/37.5 B |

*Primary Examiner*—Joan E. Welcome

[57] ABSTRACT

A binder composition for inorganic compounds comprising alkyl silicates, an organic solvent, a catalytic amount of a metallic salt of a carboxylic acid and if desired, an organoalkoxysilane.

7 Claims, No Drawings

BINDER COMPOSITION FOR INORGANIC COMPOUNDS

The invention relates to a binder composition, particularly to a binder composition for inorganic compounds, and more particularly to an improved binder composition which contains certain types of hydrolysis catalysts.

It is generally known that alkyl silicates which have been dissolved in an organic solvent can be employed as a binder composition for inorganic compounds. Likewise, it is known that alkyl silicates which have been dissolved or dispersed in water prior to their use can be employed as binders for inorganic compounds. Also it is known that the hydrolysis of alkyl silicates can be promoted by means of hydrolysis catalysts (see M. Weist "Technische Anwendungsmoglichkeiten von Kielselsaureestern" in "Chemische Technik" 1954, pages 63 through 70, or W. Krings and W. Dittrich "Bindemittel aug Athylsilikatbasis fur keramische Materialien" in Sprechsaal fur Keramik-Glas-Email" 1960, pages 126 through 128).

Binder compositions of this invention which contain alkyl silicates, hydrolysis catalysts and an organic solvent as the sole solvent are combined with inorganic substances prior to mixing with water, whereas the compositions employed heretofore contain water, an alkyl silicate, which may be dissolved in an organic solvent and a hydrolysis catalyst. The compositions of this invention have certain advantages over the compositions used heretofore. For example, the compositions of this invention may be stored without any limitation as to time. Another advantage is that the compositions of this invention penetrate the inorganic substances to be bonded to a greater depth, a fact which is conducive to a higher degree of strength.

Compared to the acid hydrolysis catalysts which have been employed heretofore in alkyl silicate-based binder compositions for inorganic compounds, the hydrolysis catalysts employed according to this invention have the advantage that they do not dissolve or transform the bonded inorganic compounds into salts, such as carbonates; thereby avoiding the formation of efflorescences and the formation of crystallization pressures which can shatter the bonded inorganic compounds. Another advantage of the hydrolysis catalysts of this invention over the hydrolysis catalysts which have been employed heretofore is that they control the rate of the hydrolysis and discoloration of the bonded compounds, such as ocurs for instance when amines are employed as hydrolysis catalysts, is avoided.

It is, therefore, an object of this invention to provide a binder composition. Another object of this invention is to provide a binder composition for inorganic substances. Still another object of this invention is to provide a binder composition containing novel hydrolysis catalysts. A further object of this invention is to provide a catalyst which controls the rate of hydrolysis. A still further object of this invention is to provide a catalyst which does not dissolve or transform the inorganic substances into salts.

The foregoing objects and others which will become apparent from the following description are accomplished in accordance with this invention, generally speaking, by providing a binder composition for inorganic substances which comprises (1) an alkyl silicate, (2) an organic solvent, (3) a metallic salt of a carboxylic acid as a hydrolysis catalyst and, if desired, (4) an organoalkoxysilane.

The terms "alkylsilicate" or "alkylsilicates" as used herein are intended to include tetraalkoxysilanes and orthoalkylsilicates and orthosilicica acid alkylesters, as well as alkoxydisiloxanes and alkoxypolysiloxanes in which the silicon valences which are free of alkoxy groups are saturated with siloxane oxygen atoms.

The alkylsilicates (1) employed within the scope of this invention may be the same as those which have been employed heretofore in alkylsilicate binders for inorganic compounds. Examples of suitable alkoxy groups in the alkylsilicates are those having from 1 to 4 carbon atoms, such as methxy-, ethoxy-, n-propoxy-, isopropoxy- and the n-butoxy groups. It is preferred that the alkyl silicates contain ethoxy groups, since the ethanol produced during the hydrolysis is not objectionable. When alkoxypolysiloxanes are used in the binder composition it is preferred that the alkoxypolysiloxane contain a maximum of 10 silicon atoms per molecule in order to avoid an undesirable increase in viscosity. Examples of suitable alkylsilicates are tetraethylsilicate or tetraethoxysilane, propylsilicate, n-butyl silicate, hexaethoxydisiloxane and polyethylsilicate having an $SiO_2$ content of approximately 40 percent by weight, which is known under the name of "Ethylsilicate 40" and which consists mostly of dodecaethoxypentasiloxane (according to "Ullmanns Enzyklopadie der technischen Chemie" Volume 15, Munich-Berlin 1964, page 765). Mixtures of alkylsilicates which vary with respect to their alkoxy groups or their degree of polymerization may also be employed.

The amount of alkylsilicate (1) in the binder composition is from 2 to 97.99 percent by weight and more preferably between 20 and 80 percent by weight based on the total weight of all components (1), (2), (3) and (4). The value "97.99" with respect to component (1) as well as with respect to component (2) is based on the difference between 100 and the sum of the appropriate minimum amounts of components (2) or (1) and (3).

The organic solvents (2) which are employed within the scope of this invention may be identical to those which have been employed heretofore in binder compositions with alkylsilicates. In order that the solvents will evaporate within a reasonable period of time during use, their boiling points should not be above about 250°C. at 760 mm Hg (abs). Suitable examples of organic solvents are aliphatic hydrocarbons, such as alkanes having boiling points in the range of from 120° to 180°C. at 760 mm Hg (abs), aromatic hydrocarbons such as toluene, xylene, trimethylbenzene, styrene and a solvent which is commercially available under the name of "Deasol 99" (registered trademark) having a boiling range of from 155° to 175°C. at 760 mm Hg (abs) and contain up to 99 percent by weight of aromatics having 9 or 10 carbon atoms, as well as chlorohydrocarbons such as trichloroethylene, alcohols such as ethanol, isopropanol and diacetonalcohol; ketones, such as acetone and methylethylketone; as well as esters, such as ethylacetate; and ethers such as di-n-butylether. In order that the binder composition will thoroughly penetrate into the inorganic compounds which are to be bonded and in order to obtain a sufficiently rapid hydrolysis of the organosilicon compounds employed within the scope of this invention, it is preferred that at least one component of the organic solvent (2) be a solvent which can be mixed with water, such as for example the above mentioned alcohols and ketones.

The amount of organic solvent (2) based on the total weight of the components (1), (2), (3) and (4) is between 2 and 97.99 percent by weight and more preferably from about 10 to about 50 percent by weight.

The catalysts (3) employed in the binder composition of this invention are metallic salts of carboxylic acids or oganometallic salts of carboxylic acids. These metallic or organometallic carboxylic acid salts are employed as catalysts because they control the rate of hydrolysis and provide the desired degree of hydrolysis. The preferred metals of the metallic salts are those ranging from lead to manganese in the electromotive series, and more preferably the tin compounds. Examples of suitable tin compounds of metallic or oganometallic salts of carboxylic acids (3) are dibutyltin dilaurate, dibutyltin diacetate, tin-II-octoate, a dibutyltin diacylate in which the acylate groups are derived from a mixture of carboxylic acids having from 9 to 11 carbon atoms per molecule, with 90 percent by weight of the carboxyl groups of the acid being linked to a tertiary hydrocarbon atom; and diacyloxytetraalkyldistannoxanes, such as diacetoxytetrabutyldistannoxane and dioleyltetramethyldistannoxane. Other examples of metallic salts of carboxylic acids (3) are ferrioctoate, lead octoate, lead laurate and cobalt naphthenate.

Mixtures of various metallic carboxylic acid salts and/or organometallic carboxylic acid salts may be employed in the binder composition of this invention.

The amount of metallic carboxylic acid salt (3) and/or organometallic carboxyic acid salt (3) should be from about 0.01 to 10 percent and more preferably from 1 to 5 percent by weight based on the total weight of the components (1), (2), (3) and (4).

When it is desired not only to bond the inorganic substances but to simultaneously render them hydrophobic, then the binder composition should also contain organoalkoxysilane (4) in addition to components (1), (2) and (3). The organoalkoxysilanes are monomeric compounds, preferably those corresponding to the general formula $R_{4-n}Si(OR')_n$, where R is an alkyl- or aryl radical having from 1 to 14 carbon atoms, $R'$ is an alkyl radical having from 1 to 6 carbon atoms and n is 1, 2 or 3. The above mentioned examples relating to the alkoxy groups in alkylsilicate (1) are equally applicable to the $OR'$ groups in the organoalkoxysilanes (4). Due to its availability, the methyl radical is the preferred R radical. Additional examples of alkyl or aryl radicals represented by R are ethyl-, n-propyl-, isopropyl-, tetradecyl radicals and the phenyl radicals. Because of its availability, n preferably has a value of 3. The preferred organoalkoxysilane (4) is methyltriethoxysilane. Mixtures of various organoalkoxysilanes may also be employed.

The amount of organoalkoxysilane (4) employed in the binder composition of this invention ranges from 1 to 95.99 percent by weight, preferably from 20 to 80 percent by weight based on the total weight of the components (1), (2), (3) and (4). The value "95.99" is based on the difference between 100 and the sum of the necessary minimum percentages of the components (1), (2) and (3). The use of alkylsilicate (1) and organoalkoxysilane (4) in equal or nearly equal weight ratios is particularly desirable.

The binder composition of this invention containing (1) an alkylsilicate, (2) an organic solvent, (3) catalyst and, if desired, (4) an organoalkoxysilane is mixed with the inorganic substance in a substantially unaltered condition, i.e., the alkoxy groups of the organic silicon compounds (1) and (4) are not hydrolyzed prior to mixing with the inorganic substances. Hydrolysis of the alkoxy groups occurs essentially on contact with the inorganic substances due to the presence of water vapor in the atmosphere and water which is absorbed by the inorganic substances to be bonded. It should be emphasized that the binder composition of this invention is not intentionally mixed with water prior to the addition of the inorganic substances.

Examples of inorganic compounds which can be bonded with the binder composition of this invention are particularly sandstones and especially masonry stone construction which has been built from natural sandstone that is endangered by weathering, as well as objects made of fired clay or loam, sands, inorganic powders and mica, as well as asbestos-cement products and concrete or plaster molds and coatings.

The terms "binder composition" and "binders" are meant to include "strengthening agents" which would be particularly applicable in connection with the application of an alkylsilicate to sandstone.

The binder compositions which are the subject of this invention are generally employed in amounts of from 30 to 5,000 grams and preferably of from 1,000 to 2,000 grams of components (1), (3) and (4) per square meter of surface of the inorganic substances which are to be bonded. The binder can be placed in contact with the to be bonded substances by any suitable means, such as for example, immersion, pouring, coating, spraying or mixing.

Various embodiments of this invention are further illustrated in the following examples in which all parts and percentages are by weight unless otherwise specified.

EXAMPLE 1

Concrete prisms of varying hardness measuring 16 × 4 × 4 cm are prepared in accordance with German Industrial Standard DIN No. 1164, June 1970, page 7.

The test specimen for "hardness I" was prepared in the following manner:
   1 bag standard sand (1350 parts)
   450 parts white cement PZ 450 F
   270 parts water The test specimen for "hardness II" was prepared as follows:
   1 bag standard sand (1350 parts)
   225 parts white cement PZ 450 F
   270 parts water The test specimen for "hardness III" was prepared as follows:
   1 bag standard sand (1350 parts)
   112 parts white cement PZ 450 F
   220 parts water After they had dried, each of the prisms was immersed in each of the following mixtures (A) to (C) which had the following composition:

A.
   37.5 percent methyltriethoxysilane
   37.5 percent hexaethoxydisiloxane
   16 percent methylethylketone
   6 percent acetone
   1 percent dibutyltindilaurate B.
   37.5 percent methyltriethoxysilane
   37.5 percent tetraethylsilicate 16 percent styrene
8 percent acetone
1 percent dibutyltindilaurate C.
37.5 percent methyltriethoxysilane
37.5 percent tetraethylsilicate
24 percent of a solvent mixture having a boiling range of from 155° to 175°C. at 760 mm Hg (abs) which consists of about 99 percent aromatics having 9 or 10 carbon atoms.
1 percent tin-II-octoate Following immersion the prisms are dried at room temperature for 3 days in atmospheric moisture and then broken apart. The areas of fracture are sprayed with dyed water. The portion of the areas of fracture into which the organosilicon compound has penetrated remains unchanged, thus indicating the depth of penetration of the mixture employed, while the remainder of the fracture area is dyed. The following results are obtained:

| Mixture | Penetration Depth (cm) in Test Specimen with | | |
|---|---|---|---|
| | Hardness I | Hardness II | Hardness III |
| (A) | 1.2 | Entirely Saturated | Entirely Saturated |
| (B) | 1.1 | " | " |
| (C) | 0.8 | " | " |

The term "entirely saturated" means a penetration of at least 2 cm.

EXAMPLE 2

Hard sandstone cubes (from Baumberg, Westfalen, German Federal Republic) having the following composition:
40 percent $SiO_2$
31 percent $CaO$
1 percent $Fe_2O_3$
1 percent $Al_2O_3$
23 percent $CO_2$ are immersed for 1 minute in the mixture (A) of Example 1 and then dried for 3 days at room temperature in atmospheric moisture. The cubes are then fractured and the depth of penetration of the organic silicon compounds is determined in accordance with Example 1. The depth of penetration is 4 to 5 mm.

EXAMPLE 3

Prisms with the dimensions of 16 × 4 × 4 cm are prepared by firing mixtures of clay and sand. Six prisms are immersed for one minute in mixture (a) Example 1 or in mixture (D). The composition of mixture (D) is:
37.5 percent methyltriethoxysilane
37.5 percent tetraethylsilicate
22 percent methylethylketone
3 percent dibutyltindilaurate The prisms are then dried at room temperature for 14 days in the presence of atmospheric moisture. Their resistance to compression is then determined in a testing machine according to DIN 1164, June 1970:

| Specimen | Compression resistance ($kp/cm^2$ or $kg/cm^2$) |
|---|---|
| untreated | 25 ± 3 |
| treated with mixture A | 51 ± 6 |
| treated with mixture D | 48 ± 7 |

EXAMPLE 4

A mixture containing 80% standard sand and 2 percent magnesium oxide is mixed with 18 percent of mixture (A) of Example 1 or 18 percent of mixture (E). The thus obtained mixtures are measured in glass rings which are 4 cm high and have a diameter of 4 cm. The composition of mixture (E) is:
70 percent hexaethoxydisiloxane
18 percent methylethylketone
6 percent acetone
1 percent tin-II-octoate After drying for 8 days at room temperature in the presence of atmospheric moisture, the specimens obtained are tested as to their average compression resistance.

The following values are obtained:

| Specimens obtained with mixture | Compression resistance ($kp/cm^2$ or $kg/cm^2$) |
|---|---|
| (A) | 12 |
| (E) | 16 |

EXAMPLE 5

Four opposing sides of sandstone cubes measuring 4 × 4 × 4 cm of the type described in Example 2 are immersed for 1 minute each in mixture (A) of Example 1 then stored for 14 days at room temperature in the presence of atmospheric moisture. Then one of the untreated sides as well as untreated sandstone cubes are immersed for 16 hours to a depth of 1 cm in an unsaturated aqueous solution of sodium sulfate. Thereafter the cubes are heated for 4 hours at 110°C. in a drying chamber and allowed to cool to room temperature over an additional 4 hour period in a dessiccator. This heating and cooling sequence is repeated five times. Subsequently the edges of the untreated cubes appear considerably damaged. The treated cubes remain unchanged.

Although specific examples of the invention have been herein described, it is not intended to limit the invention solely thereto but to include all the variations and modifications following within the spirit and scope of the appended claims.

What is claimed is:

1. A binder composition substantially free of water which is mixed with inorganic substances prior to hydrolysis comprising (1) an alkyl silicate having alkoxy groups of from 1 to 4 carbon atoms and those silicon valences which are free of alkoxy groups are satisfied with siloxane oxygen atoms (2) an organic solvent having a boiling point up to about 250°C. and (3) a catalytic amount of a hydrolysis catalyst selected from the class consisting of carboxylic acid metallic salts and carboxylic acid organometallic salts in which the metals are selected from those ranging from lead to manganese in the electromotive series, said alkyl silicate is present in an amount of from about 2 to about 97.99 percent based on the total weight of the composition containing components (1), (2) and (3).

2. The binder composition of claim 1 wherein the composition also contains an organoalkoxysilane (4) in an amount of from about 1 to 95.99 percent by weight based on the total weight of components (1), (2), (3), and (4).

3. The binder composition of claim 1 wherein the catalyst is a carboxylic acid metallic salt.

4. The binder composition of claim 1 wherein the catalyst is a carboxylic acid organometallic salt.

5. The binder composition of claim 2 wherein the catalyst is present in an amount of from 0.01 to 10 percent by weight based on the total weight of the components (1), (2), (3) and (4).

6. The binder composition of claim 3 wherein the catalyst is a carboxylic acid tin salt.

7. The binder composition of claim 4 wherein the catalyst is a carboxylic acid organotin salt.

* * * * *